(12) United States Patent  (10) Patent No.: US 7,599,474 B2
Zellner et al.  (45) Date of Patent: *Oct. 6, 2009

(54) VOICE RECOGNITION FOR FILTERING AND ANNOUNCING MESSAGE

(75) Inventors: Samuel N. Zellner, Dunwoody, GA (US); Mark J. Enzmann, Roswell, GA (US); Robert T. Moton, Jr., Alpharetta, GA (US)

(73) Assignee: AT+T Intellectual Property II, L.P., New York, NY (US)

( * ) Notice: Subject to any disclaimer, the term of this patent is extended or adjusted under 35 U.S.C. 154(b) by 386 days.

This patent is subject to a terminal disclaimer.

(21) Appl. No.: 11/598,502

(22) Filed: Nov. 13, 2006

(65) Prior Publication Data

US 2007/0127635 A1 Jun. 7, 2007

Related U.S. Application Data

(63) Continuation of application No. 09/471,315, filed on Dec. 23, 1999, now Pat. No. 7,136,458.

(51) Int. Cl.
*H04M 1/64* (2006.01)
(52) U.S. Cl. .................................... 379/88.02; 704/246
(58) Field of Classification Search .............. 379/88.03, 379/88.02, 88.01, 69, 70, 207.15, 201.07; 455/414; 704/270, 273, 275, 246
See application file for complete search history.

(56) References Cited

U.S. PATENT DOCUMENTS 6,385,303 B1 * 5/2002 Peterson et al. ............ 379/67.1
6,445,775 B1 * 9/2002 Morganstein et al. ..... 379/88.02

* cited by examiner

*Primary Examiner*—Olisa Anwah

(57) ABSTRACT

A system and method of call-routing and caller-screening that employs voice recognition to automatically recognize a caller's voice and then screen a caller, if appropriate; all without forcing the caller to identity himself/herself, which may be perceived as rude or offensive by some callers. Instead, a synthesized voice automatically asks the caller to identify who the caller wishes to speak with. Caller's response to this query is used to identify the callee as well as to optionally identify the caller. Thus, the screening of the caller takes place in a manner that the caller perceives as a more natural way of telephone communication. Caller's speech is used to generate digital voice samples therefrom and the caller's voice samples are directly compared with other voice samples stored in a database without converting the voice samples into digital text files. Present methodology is particularly useful when it is desired to limit one or more caller's direct access to the called party as well as to identify a caller before the called party wishes to proceed with the call. The digital call assistant system of the present invention may be implemented, for example, in a telephone company central office, in a PBX in an organization or as part of a wireless network. Subscription-based automatic caller-screening service may also be provided by a telephone service provider using the call assistant system of the present invention.

20 Claims, 5 Drawing Sheets

VOICE RECOGNITION FOR FILTERING AND ANNOUNCING MESSAGE

CROSS REFERENCE TO RELATED APPLICATIONS

This application is a continuation of U.S. application Ser. No. 09/471,315, filed Dec. 23, 1999, entitled "Voice Recognition for Filtering and Announcing Message," which will issue on Nov. 14, 2006 as U.S. Pat. No. 7,136,458, which is incorporated herein by reference.

BACKGROUND OF THE INVENTION

1. Field of the Invention

The present invention broadly relates to systems for telephone caller identification, and more particularly, to a system and method to identify a telephone caller by performing voice recognition on the callee identification information spoken by the caller.

2. Description of the Related Art

Telephone communication has seen a phenomenal growth since its inception because of its extreme usefulness in today's world. It is hard, and almost impossible, to conceive a world without telephones. Telephones have almost become an integral part of a civilized society. However, the advances in telephony have brought with them some undesirable consequences. For example, when a called party (or "callee") does not wish to speak with a particular person or persons, any calls from these calling parties (or "callers") will be perceived by the callee as a major source of disturbance and annoyance. The callee may not wish to accept a telephone call from a particular caller for a variety of reasons, such as, callee's preoccupation with an important task, callee's desire for privacy, the caller is a telemarketer, etc.

The callee may thus wish to selectively receive a call based on the prior determination of the identity of the caller. In other words, the called party may prefer to determine who the caller is prior to receiving the call. One obvious way to accomplish this is to route all the calls to a human operator who first determines the identity of the caller and then asks the called party (while putting the caller on hold) whether the call is to be accepted or not. If the called party indicates that the caller is an unwanted caller or the caller be connected to an automatic message recording system, the human operator may politely refuse the access to the callee and/or connect the caller to the message recording system. This approach, however, requires presence of a human operator which may not be desirable and cost-effective. Furthermore, some callers may perceive the inquiry by the operator of their names as offensive or rude.

A second approach to pre-screen a caller is to provide the called party with a visual indication of the name of the caller so that the called party can determine whether to accept the call or not. A typical visual indication may be provided by subscribing to the caller name identification service (also known as the 'calling name service'). However, the calling party may ask the telephone service provider to "block" the transmission of the caller's name to the display apparatus of the called party. In other words, the caller may easily circumvent the identity detection aspect of the calling name service. In such an event, the callee may not be able to avoid or screen the call without first speaking with the caller.

In the third approach, an automatic caller screening device is employed to identify and screen the caller (if necessary) prior to forwarding the call to the called party. FIG. 1 illustrates how a prior art automatic digital call assistant 10 functions as a caller-screening interface between a calling party 12 and a called party 14. Such automatic call-screening devices may typically be employed in an organization where it may not be desirable to allow unfettered access by the outside callers to the called parties (i.e., the employees of the organization). Initially, the caller 12 dials the phone number of the called party 14 (step 15). The call assistant unit 10 first receives the call placed by the caller and automatically enters into an off-hook condition. This establishes a telephone communication link between the caller 12 and the digital call assistant 10.

Thereafter, at step 16, the call assistant 10 generates, in a synthesized voice, a greeting and/or an announcement (e.g., "Thank you for calling XYZ corporation. This is an automatic answering service for Mr. ABC.") followed by a query asking the caller to speak the caller's name (e.g., "Please tell me who you are," or "Please clearly speak your name."). In response to the name query by the call assistant unit 10 for the called party 14, the calling party 12 may either hang up or provide the caller's name at step 17. The spoken words constituting the caller's name are thus received by the digital call assistant 10 at step 17. To prevent the caller from disconnecting, the call assistant 10 may optionally play a second announcement (e.g., "Please hold on while I connect you to Mr. ABC," or "You are being connected to Mr. ABC. Please do not disconnect," or, simply, "Please hold for a moment.") at step 18.

In the meantime (i.e., while the caller is on hold), at step 19, the digital call assistant 10 creates a digital sound file (also referred to as a 'digital audio file') from the spoken syllables received from the caller. The digital audio file may be a wave (".WAV") file. The .WAV file is then converted into a digital ASCII (American Standard Code for Information Interchange) text file at step 20. The ASCII text file is thus generated based on speech recognition of the speech uttered by the caller. Assuming that the caller's name is John Doe, the speech-to-text conversion at step 20 results in the ASCII text file sequentially containing (in hexadecimal notation) ASCII codes 4A, 4F, 48, 4E for letters "J", "O", "H" and 'W' respectively; ASCII code 20 for the 'blank' between the words "John" and "Doe"; and ASCII codes 44, 4F and 45 for letter "D", "O and "E" respectively. Thus, the caller's name is represented within the call assistant 10 as a string of binary 1's and 0's.

The call assistant 10 then queries, at step 21, a portion of a database that is associated with the called party to determine whether the called party has placed any restriction on the calls from that specific caller. The ASCII file containing the name of the caller is compared with other ASCII files within the database to find a matching name, i.e., to determine whether the caller is one of the proscribed callers. Here, Mr. ABC may identify (in the database) that calls from caller John Doe need not be forwarded to Mr. ABC. Alternatively, Mr. ABC may not put any restriction on the calls from caller John Doe. Thus, depending on the information in the database, the digital call assistant 10 may generate appropriate announcement at step 22. If the caller 12 is allowed to be connected to the called party 14, the announcement may state so (e.g., "You are being connected to Mr. ABC. Please continue to hold."). On the other hand, if the caller 12 is not allowed to directly call the callee 14, the announcement may indicate that the called party 14 is unavailable to answer the phone (e.g., "Mr. ABC is not in his office at this time. Please enter "0" to access his voice mail-box," or, simply, "Sorry, Mr. ABC is not in his office. Goodbye."). If the caller 12 is allowed to proceed with the call, the call assistant 10 sets up a call to the called party 14 at step 23. This directly connects the calling party 12 and the called party 14 and a telephone conversation between them proceeds at step 24 once the called party 14 answers the call.

Even the speech recognition-based automated caller-screening approach described hereinbefore with reference to FIG. 1 has certain undesirable attributes to it. The initial inquiry of the caller's name may not be received favorably by a number of callers. Such an inquiry may instead be perceived as unduly intrusive and as requiring information about caller's personal identity in an unnatural way and at a time when it may be too premature and awkward to ask the caller's name. Furthermore, if a caller always gets an announcement that the called party is unavailable to take the phone call after every interaction with the digital call assistant (including caller's self-identification every time the caller interacts with the digital call assistant), the caller may start suspecting that the called party is screening the caller based on the self-identification information provided by the caller. Such a negative impression by the caller may not be desirable, especially when there is a professional relationship between the caller and the callee.

It is therefore desirable to automatically screen a caller without asking the caller to identify himself/herself. It is also desirable that the screening of the caller takes place in a manner that the caller perceives as a more natural way of telephone communication.

SUMMARY OF THE INVENTION

According to the present invention, a method of screening a caller prior to establishing a telephone connection between the caller and a callee comprises receiving a telephone call from the caller; prompting the caller to speak the name of the callee; receiving the name of the callee when spoken by the caller; and identifying the caller by analyzing the voice of the caller received when the caller speaks the name of the callee. The caller is prompted in a synthesized voice to speak the name of the callee. When the caller speaks the name of the callee, the analog voice signals are converted into a digital sound file. A set of one or more voice exemplars is then generated from this digital sound file. Thus, caller's voice is captured as a set of voice exemplars that is compared with different voice samples stored in a database to determine the identity of the caller.

In one embodiment, the callee is identified by converting the digital sound file created when the caller announces the name of the callee into a digital text file, eg., an ASCII file. This digital text file is then compared with other digital text files stored in the database carrying identification information, e.g., names, of different callees. The callee with the matching text file is then considered the recipient of the telephone call placed by the caller.

A digital call assistant system according to the present invention includes a voice recognition unit that receives the caller's voice and analyzes it using voice recognition techniques. The voice recognition unit also generates the voice exemplars from the digital sound file created from the caller's voice. The database is coupled to the voice recognition unit to receive the caller's voice exemplars and also to perform the comparison of various voice samples under control of the voice recognition unit.

A call routing module is provided as part of the digital call assistant system to route the caller's call to a destination specified by the voice recognition unit. When the voice recognition unit determines, with the help of the database, that the caller is one of the callers authorized to directly place a call to the called party (i.e., the callee), the voice recognition unit instructs the call routing module to route the caller's call to the called party's telephone unit. However, if the caller is found to be one of those callers not authorized to directly place a call to the callee, then the voice recognition unit instructs the call routing module to route the call to an automated message recording system where the caller can leave a voice message for the callee. In one embodiment, the voice recognition unit may instruct the call routing module to simply disconnect the telephone call if the caller is one of the unauthorized callers.

A subscription-based caller-screening service may be provided by a telephone service (wireline or wireless) provider using the digital call assistant system of the present invention. In a wireline telephone service, the electronic switch in a telephone company central office or in a private branch exchange (PBX) may be modified to include the voice recognition module as well as the call routing module. The central office or PBX may further include the database and the message recording system. In a wireless telephone service, a mobile switching center may include the call routing module whereas an intelligent peripheral may be configured to implement the voice recognition module, the database unit and, optionally, the message recording system.

Initial storage (in the database) of voice samples of different callers may be accomplished with instructions received from the called party. Thus, the called party may decide whose voice samples need be stored and, hence, which caller is to be authorized to directly place a call to the callee. In the present invention, caller identification and screening is accomplished without forcing the caller to identity himself/ herself, which may be perceived as rude or offensive by some callers. Instead, the caller is asked to identify who the caller wishes to speak with. Caller's response to this query is used to identify the callee as well as to optionally identify the caller. Thus, the screening of the caller takes place in a manner that the caller perceives as a more natural way of telephone communication. In the present invention, the caller is identified using a voice-to-voice comparison method instead of a voice-to-text conversion followed by a text-to-text comparison method of the prior art.

BRIEF DESCRIPTION OF THE DRAWINGS

Further advantages of the present invention may be better understood by referring to the following description taken in conjunction with the accompanying drawings, in which.

DETAILED DESCRIPTION OF PREFERRED EMBODIMENTS

Figure 2:
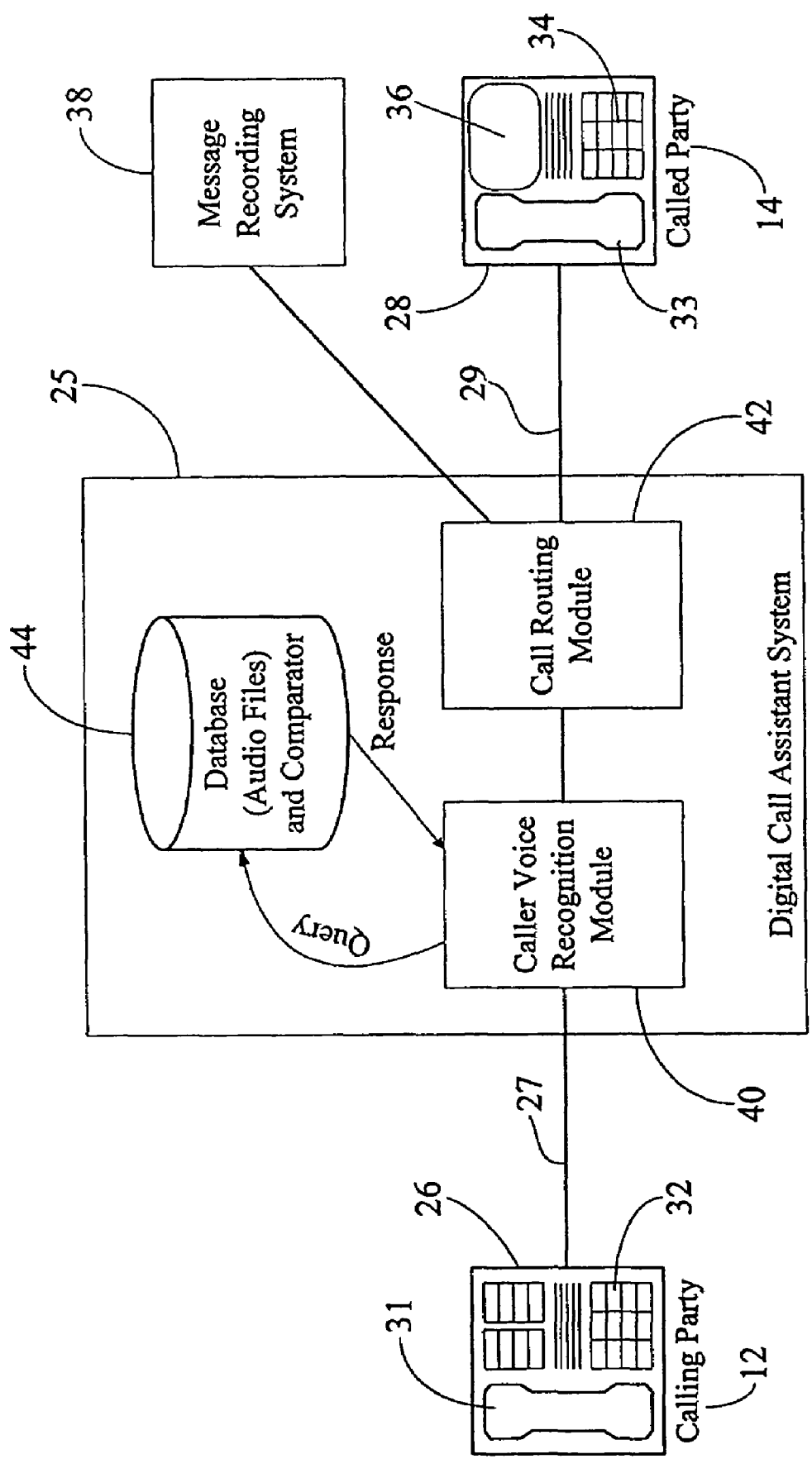
FIG. 2 depicts an exemplary setup where a digital call assistant system according to the present invention is interfaced between the calling party and the called party to screen the caller.

Referring now to FIG. 2, an exemplary setup is depicted where a digital call assistant system (DCAS) 25 according to the present invention is interfaced between the calling party (or "caller") 12 and the called party (or "callee") 14 to screen the caller 12. The calling party telephone 26 is shown connected to the DCAS 25 via a telephone line 27. The callee telephone unit 28 is shown connected to the DCAS 25 via a telephone line 29.

The caller 12 may place a call and, hence, communicate with the callee 14 (and also with the DCAS 25) by using a handset 3 1 and a keypad 32 provided on the telephone unit 26. The callee telephone unit 28 may have a handset 33 and a keypad 34 to allow the callee 14 to place an outgoing call or to receive an incoming call. As described hereinbelow, the callee 14 may also notify the DCAS 25, using the keypad 34, about the identity of one or more callers who need be blocked from directly accessing the callee's telephone unit 28. In one embodiment, the callee telephone unit 28 is also provided with a display screen 36 so that one or more messages may be displayed thereon. For example, after identifying the caller, the DCAS 25 may display the caller's name on the screen 36, thereby visually informing the callee 14 of the identity of the caller 12. The visual indication may be desirable, for example, when the callee 14 wishes not to respond to the call (even if the call from that specific caller is not blocked) without actually lifting the handset 33 and, hence, without informing the caller 12 of the callee's presence.

A message recording system 38 may be connected to or made p a. of the DCAS 25 in the event that the caller 12 is refused direct access to the called party 14 and the caller 12 wishes to leave a voice message for the called party 14, or in the event that the callee 14 is unavailable or does not wish to communicate with the caller 12 even when the caller 12 is not one of the proscribed callers refused direct access to the called party 14. The DCAS 25 may inform the caller 12 of the option to leave a voice message for the callee 14 and may request the caller 12 to enter a specific digit (between "0" to "9") and/or a specific symbol (* or #) from the keypad 32 so as to enable the DCAS 25 to direct the call to the message recording system 38. In a large organization, the message recording system 38 may have mailboxes for each individual employee of the organization. The message recording system 38 may either store the messages in a digital form (e.g., on a RAM (random access memory) chip) or in an analog form (e.g., on an audio cassette tape or any other magnetic storage medium).

The digital call assistant system 25 according to the present invention is shown to include three components: a caller voice recognition (VR) module 40, a call routing (CR) module 42 and a database and comparator DC) unit 44. The VR module 40 identifies the caller 12 with the help of the DC unit 44 and instructs the CR module 42 where to route the call to, i.e., whether to the called party's telephone 14 or to the message recording system 38, or whether to disconnect the call from a specific caller.

As described in more detail hereinbelow, the screening or identification of the caller is performed using voice recognition techniques. Generation of voice samples (or voice exemplars) of the caller's voice is performed when the caller 12 speaks the called party's name when prompted by the VR module 40. Caller's voice exemplars are then compared with earlier-stored voice exemplars in the DC unit 44 and a decision is made as to the identity of the caller 12. The DC unit 44 thereafter determines whether the caller 44 is authorized to directly contact the called party 14 and informs the VR module 40 of its decision. The VR module 40 then instructs the CR module 42 as to further processing of the call, i.e., whether to direct the call to the called party's telephone unit 28 or to the message recording system 38, or whether to disconnect the call. The caller 12 is thus requested to identify the called party 14 and the response of the caller 12 is used to identify the caller, without ever asking the name of the caller 12.

Figure 3:
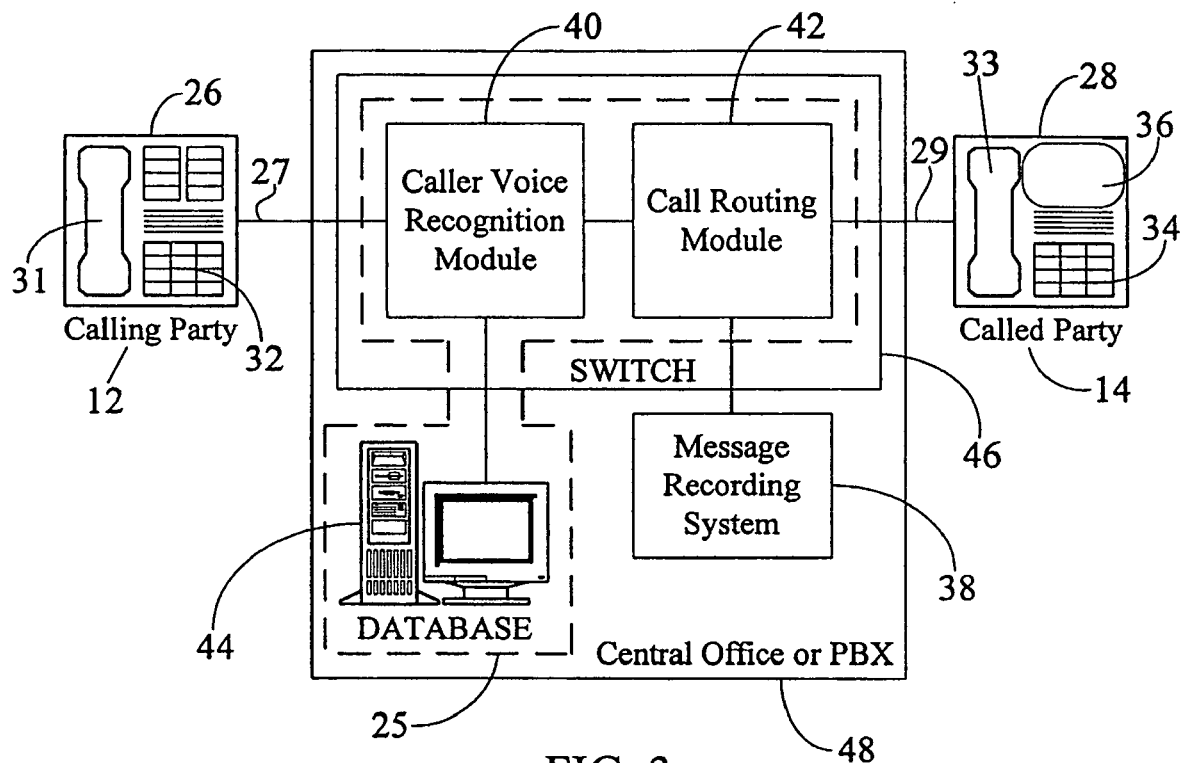
FIG. 3 illustrates an exemplary implementation of various modules of the digital call assistant system according to the present invention in a telephone company central office or in a PBX.

FIG. 3 illustrates an exemplary implementation of various modules of the digital call assistant system 25 according to the present invention in a telephone company ("telco") central office or in a PBX. The same reference numeral '48' is used to refer either to the central office facility or to the PBX in an organization. It is noted that a telephone service provider may provide the caller-screening service (as described in more detail hereinbelow) to the telephone service subscribers either as part of the basic telephone service or as an extra service for additional cost.

The caller's telephone 26 may be connected to the DCAS 25 through a switch 46 in the telco central office or PBX (private branch exchange) 48. A PBX may be present in an organization or a corporation having a large number of internal telephone units. A call placed by the caller 12 (using the telephone 26) may thus be routed to the DCAS 25 through the switch 46. The callee telephone unit 28 may also be connected to the DCAS 25 through the telco central office or PBX 48 as illustrated in FIG. 3. The DCAS 25 may be a part of the central office or PBX 48. In that case, a call placed by the caller 12 is first received at the PBX 48, and the DCAS 25 within the PBX 48 is activated upon the receipt of the phone call to execute a caller-screening operation prior to forwarding the call (if applicable) to the appropriate callee 14 (i.e., to the callee's telephone unit 28).

The VR module 40 and the CR module 42 may be implemented in software. When the DCAS 25 is part of a telco central office or a PBX 48, the software that implements the CR module 42 as well as the software that implements the VR module 40 may reside in a switching unit or switch (or "electronic switch") 46 within the central office or PBX 48. The DC unit 44 may be an independent computer system residing within the central office or PBX facility 48 as depicted in FIG. 3. This computer system may be modified to also implement the functionality of the VR module 40. In that event, the switch 46 may implement only the CR module 42. The computer system (with VR module 40 and DC unit 44) may then be connected to the electronic switch 46. Similarly, the message recording system 38 may also optionally be included as part of the central office or PBX facility 48. The VR module 40 may include voice recognition software developed by a number of commercial vendors such as, for example, the IBM Corporation or the Dragon Systems, Inc. of 320 Nevada St., Newton, Mass., USA 02460.

In one embodiment, the software that implements the VR module 40 may reside on a computer system that also implements the DC unit 44. Such a computer system may be located external to the central office or PBX facility 48. In other words, the central office or PBX 48 may implement only the CR module 42 functionality through the switch 46. Other alternative arrangements may also be devised.

Figure 4:
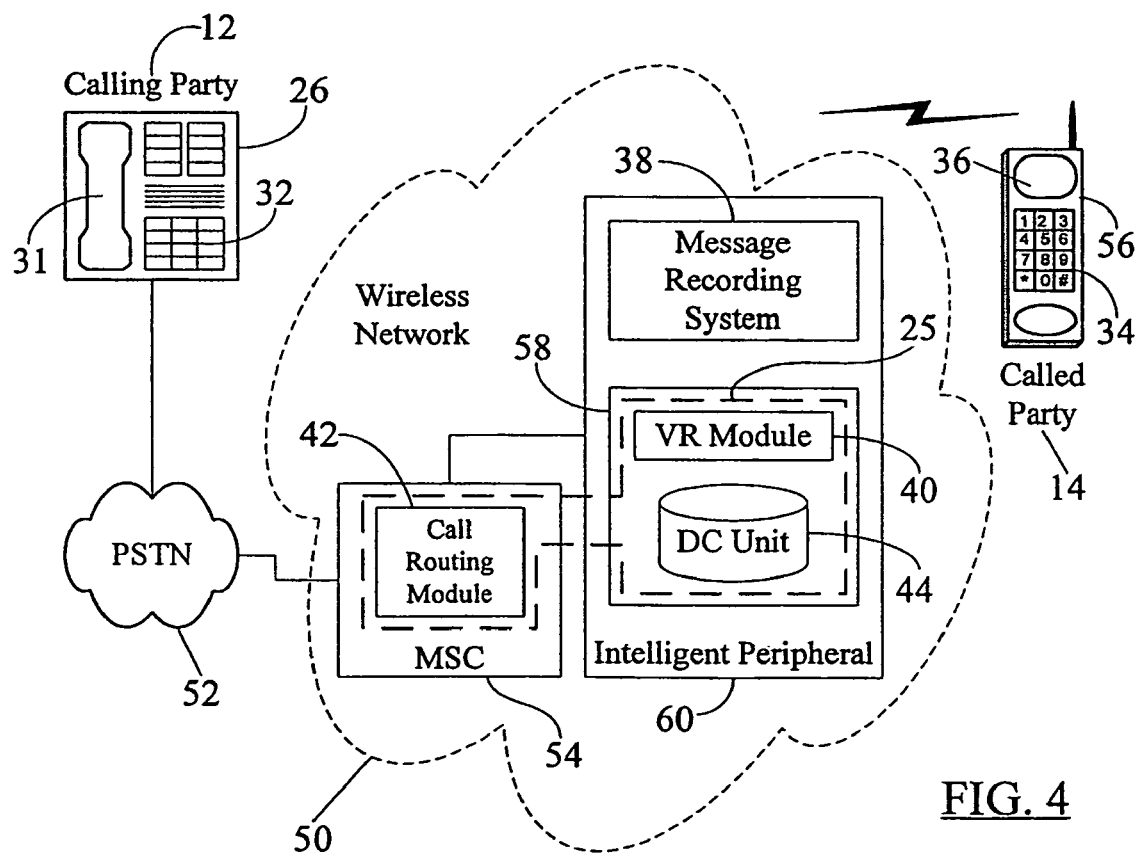
FIG. 4 illustrates an exemplary implementation of various modules of the digital call assistant system according to the present invention in a wireless telephone network.

FIG. 4 illustrates an exemplary implementation of various modules of the digital call assistant system 25 according to the present invention in a wireless telephone network 50. The wireless telephone network 50 may employ a TDMA (time division multiple access), a CDMA (code division multiple access) or any other mobile telecommunication standard. In the embodiment depicted in FIG. 4, the calling party telephone unit 26 is shown connected to a wireline telephone network, e.g., the PSTN (public switched telephone network) 52, which, in turn, is connected to a mobile switching center (MSC) 54 associated with the called party's (i.e., the mobile subscriber's) home location register (HLR) (not shown) in the wireless network 50.

Of course, the calling party 12 may be using a wireless telephone and the called party 14 may be using a wireline telephone, or both parties 12, 14 may be using wireless telephones. The functionality of the MSC 54 may be analogized with that of the switch 46 in a wireline network illustrated in FIG. 3. Thus, a call placed by the caller 12 is routed (via the PSTN 52) to the MSC 54, which, in turn, establishes a telephone connection between the calling party telephone unit 26 and the called party's handset 56.

Similar to a wireline telephone service provider, a wireless telephone network operator may also provide the caller-screening service to wireless service subscribers either free of charge or for an additional cost. In such an event, the software for the CR module 42 may reside in the MSC 54. Furthermore, the s o h e that implements the functionality of the VR module 40 and the DC unit 44 may reside in a computer system 58 that is external to the switching mechanism, i.e., the MSC 54. The computer system 58 may be part of an enhanced platform, e.g., an intelligent peripheral unit (IP) 60. The IP 60 may also provide storage to implement the optional message recording system 38. The mobile subscriber (i.e., the called party) 14 may access the IP 60 (using, e.g., an access code) to retrieve voice messages stored therein for the mobile subscriber 14. In an alternative embodiment, the software for the VR module 40 may reside in the MSC 54, which may be modified to execute the software upon receiving a call destined for the mobile subscriber 14; the DC unit 44 and the optional message recording system 38 may still be implemented via the intelligent peripheral 60. Alternative arrangements using other functional entities of the wireless network 50 (e.g., the HI, R (home location register), the SCP (signaling control point), etc.) to implement one or more modules of the DCAS 25 may also be devised.

The functionality of the DCAS 25 according to the present invention may be implemented in an AIN (advanced intelligent (telephone) network) also. An SSP (service switching point) switch (not shown) in the AIN may be configured to implement the CR module 42, whereas an SN (service node) (not shown) within the AIN may be configured to implement the VR module 40 as well as the DC unit 44. The SN may further implement the optional message recording system 38, if desired. An ISDN (integrated services digital network) service provider may also offer the caller-screening service according to the present invention as part of the service package. An arrangement similar to that shown in FIG. 3 may be made in an ISDN central office (not shown) to implement the functionality of the DCAS 25.

It was noted hereinbefore that the VR module 40 uses voice recognition to identify the caller 12. In voice recognition, various parameters (e.g., pitch, amplitude, etc.) in one or more voice exemplars extracted from the current speech of a speaker are compared with similar parameters for prior voice samples (of different speakers) stored in a database. When a voice sample is found that has the maximum number of parameters matching with the current set of voice exemplars, the speaker associated with the matching voice sample is determined to be the speaker of the current speech. The speaker is thus identified based on a prior record of the distinguishing parameters in that speaker's speech pattern. A voice recognition system may therefore be considered as a speaker-dependent system as opposed to a simple speech recognition system, which may be speaker-independent.

Figure 1:
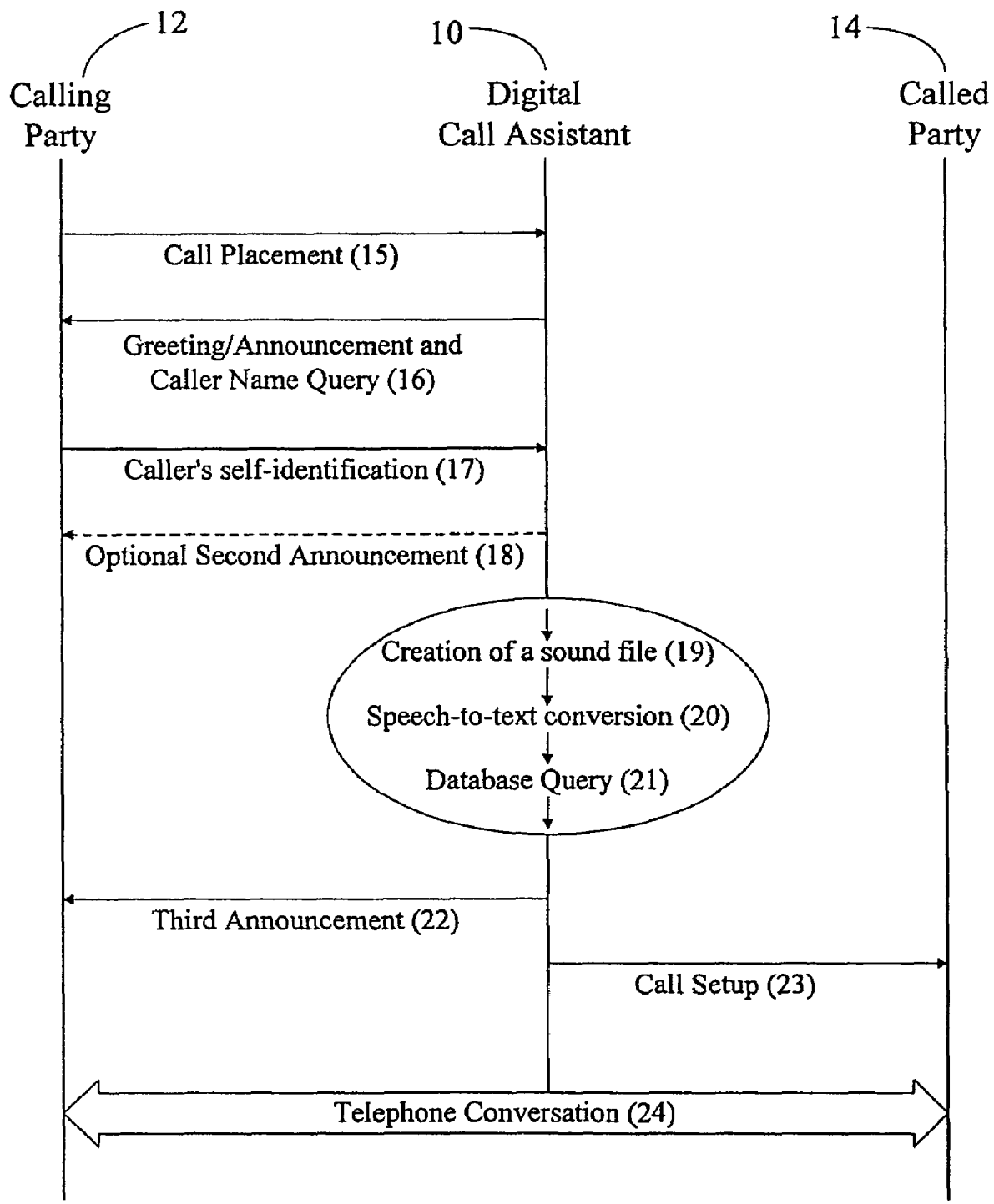
FIG. 1 illustrates how a prior art automatic digital call assistant functions as a caller-screening interface between a calling party and a called party.
Figure 5:
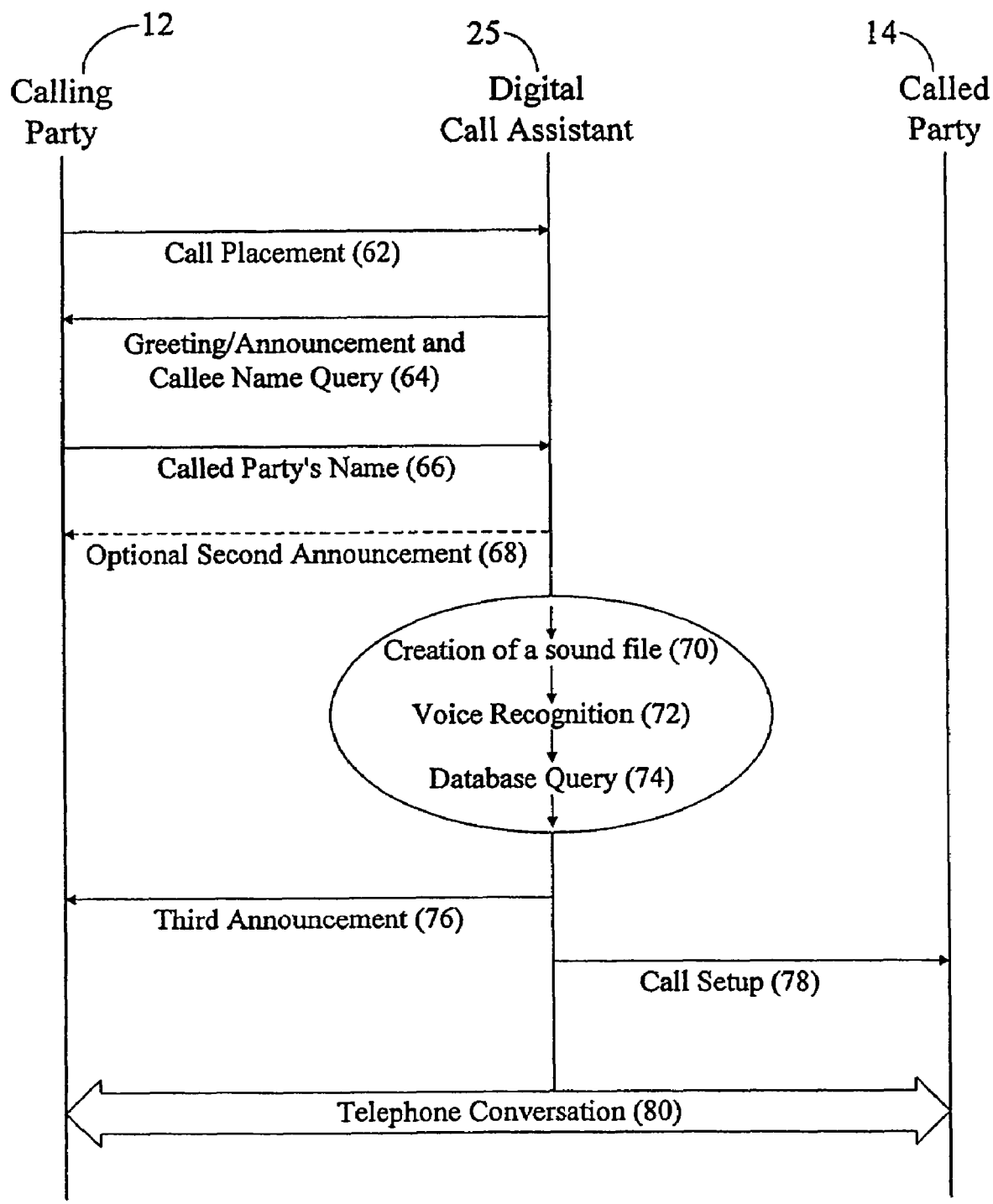
FIG. 5 shows how the digital call assistant system according to the present invention functions as a caller-screening interface between the calling party and the called party.

Referring now to FIG. 5, it is shown therein how the digital call assistant system 25 according to the present invention functions as a caller-screening interface between the calling party 12 and the called party 14. Initially, at step 62, the caller 12 places a call to the callee's telephone number. This call is received and processed by the VR module 40 in the DCAS 25. The VR module 40 establishes an off-hook condition and plays (in a synthesized voice) a greeting/announcement at step 64. The greeting/announcement may be similar to that described hereinbefore with reference to step 16 in FIG. 1. Immediately after the initial announcement/greeting, the VR module 40 prompts the caller 12, in a synthesized voice, to identify the called party 14 (e.g., "Who do you wish to speak to?' or "Please clearly speak the name of the party you wish to speak to."). In response, the caller 12 speaks, at step 66, the callee's name into the microphone (not shown) of the handset 31 (FIG. 2). The caller's speech is converted into electrical signals by the microphone (not shown) of the handset 31 and sent to the VR module 40 via the telephone line 27 (FIG. 2). The VR module 40 may optionally play a second announcement at step 68 (similar to the one mentioned hereinbefore with reference to step 18 in FIG. 1) while the VR module 40 performs voice recognition operation on the caller's speech signals.

It is noted that it is not unusual for a caller to expect a human or an automated operator to ask the caller who the caller wishes to speak to. Therefore, asking the caller to identify the called party is a more natural way of telephone communication as compared to the prior art methods of forcing the caller to identify himself/herself.

At step 70, the VR module 40 creates a digital audio or sound file from the caller's audio speech signals received over the telephone line 27. The format for the digital audio file may include one of a number of file extensions such as, for example, ".WAV" (wave file), ".AIFF" (Audio Interchange File Format), ".AU" (audio file), etc. After generating a sound file, at step 72, the VR module 40 creates one or more voice samples or voice exemplars for the caller's voice from that sound file with each sample having a predefined set of parameters (e.g., pitch, amplitude, etc.) to be mathematically analyzed to identify salient characteristics of the caller's voice. The voice exemplars are created using digital signal processing techniques as applied to voice recognition. At step 74, the VR module 40 sends the set of one or more voice exemplars to the DC unit 44 to query whether matching voice samples exist in the DC unit 44. A description of storage of voice samples in the DC unit 44 is given hereinbelow with reference to FIG. 6.

The DC unit 44, under program control by the VR module 40, compares the voice exemplars received from the VR module 40 with those stored therein for statistically optimal prediction of the identity of the caller 12. In one embodiment, the DC unit 44 may store only the voice samples (without corresponding identity information) of all those callers who have been allowed (by the callee) to directly speak with the callee. In such an embodiment, the DC unit 44 may simply check whether the voice samples from the VR module 40 match with any samples stored therein. If a match is found, the DC unit 44 may send a response to the VR unit 40, which, in turn, may inform the caller 12 (through the third announcement at step 76) that call is being forwarded to the callee 14. The VR module 40 may then instruct the CR module 42, at step 78, to transfer the call to the callee's telephone unit 28 (FIG. 2) or 56 (FIG. 4). At step 80, the caller 12 may establish a telephone conversation with the callee 14 if the c a l k 14 picks up the telephone handset 33 and responds to the call.

In an alternative embodiment, caller's identity may be determined at the same time when the voice samples from the VR module 40 are compared with voice exemplars stored in the DC unit 44. Here, the DC unit 44 may include identity information (e.g., name of the caller, name of the caller's company or employer, etc.) stored as a digital text file (e.g., an ASCII text file) along with corresponding voice exemplars for a particular caller 12. Therefore, upon finding a statistically allowable match between the presently-received voice exemplars from the VR module 40 and those stored in the DC unit 44 for a particular caller, the DC unit 44 may send to the VR module 40, as part of its response, the information identifying the caller 12 (e.g., by name) as well as an indication whether the caller 12 is one of the "authorized" callers or one of the "proscribed" callers.

The DC unit 44 may store voice exemplars of only those callers who have been given direct access to the callee 14 in the past. In such an event, all the DC unit 44 has to do is to inform the VR module 40 that a matching voice sample has been found and transmit the caller identity information to the VR module 40. The VR module 40 may, in turn, initiate two actions simultaneously: one to place the announcement at step 76 and the other to instruct the CR module 42 to setup a call at step 78. Thus, steps 76 and 78 may be performed simultaneously. The telephone conversation at step 80 may then proceed once the callee 14 responds.

As noted hereinbefore, the announcements at steps 68 and 76 may be similar to the exemplary announcements given hereinbefore with reference to steps 18 and 22 (FIG. 1) respectively. In any event, if the caller 12 is not allowed to be directly connected to the callee 14 (i.e., when no matching voice samples are found or when the DC unit 44 indicates that the caller 12 one of the proscribed callers), then the announcement at step 76 may inform the caller 12 of the option to store a voice message for the callee 14 and instruct the caller 12 to place certain digit(s) and/or symbol(s) on the keypad 32 to enter the callee's voice mailbox in the message recording system 38. Upon receipt of the appropriate selection, the VR module 40 may instruct the CR module 42 to connect the caller 12 to the message recording system 38.

Thus, the VR module 40 may not only route the caller's call to appropriate callee 14 identified through voice recognition techniques described hereinbefore, but may also route information about caller's identity along with the ringing signal to the called party's telephone unit 28 (FIG. 2) or 56 (FIG. 4). The identity of the caller 12 is determined without the need to ask the caller 12 to identity himself/herself (which may be embarrassing for a number of callers) and without the caller 12 knowing that callee 14 has been informed of the caller's identity. The caller's identity information may be routed over the telephone line 29, and the callee's telephone unit (e.g., the telephone unit 28 in FIG. 2) may display such information on a display screen (e.g., the screen 36 in FIG. 2). The display screen may be an LCD (liquid crystal display) screen.

Figure 6:
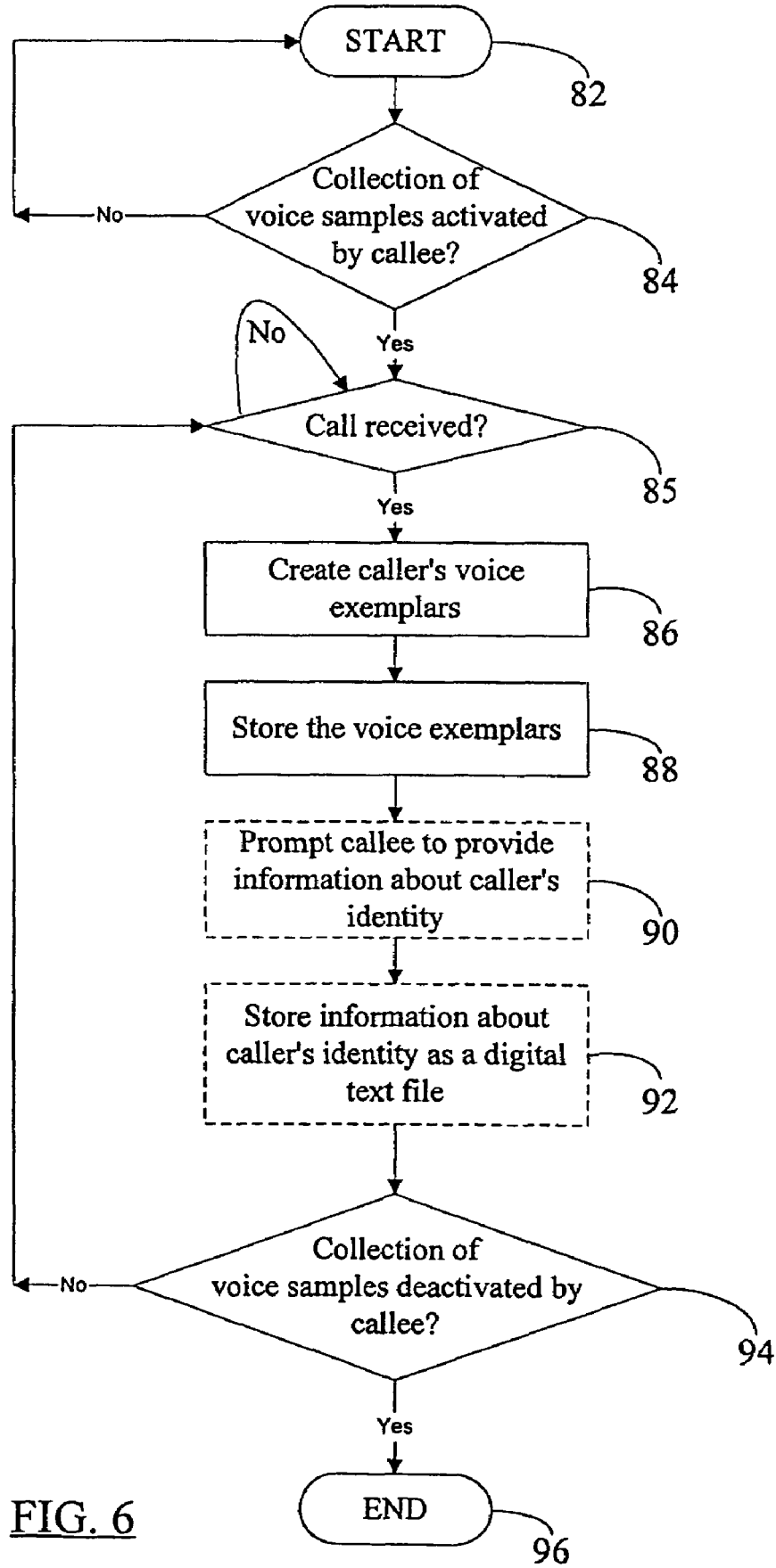
FIG. 6 is a flow diagram depicting how caller's initial voice samples and caller identity information are stored for later caller-screening operation.

Turning now to FIG. 6, a flow diagram depicting how caller's initial voice samples and caller identity information are stored for later caller-screening operation is shown therein. The functionality of the VR module 40 and the DC unit 44 may be combined to implement the flow diagram illustrated in FIG. 6. In other words, a voice-recognition software (in the VR module 40) and a database (e.g., a computer memory on a hard disk drive) interacting with the VR module 40 may perform the operations depicted in FIG. 6 to create a set of voice exemplars for future comparison and caller-screening as described hereinbefore.

Initially, at step 82, the voice recognition software (in the VR module 40) may wait for an indication by the callee 14 (FIG. 2) to collect voice samples of the caller 12. At step 84, the callee 14, via the keypad 34, may instruct the voice recognition (VR) software to create voice samples for the caller 12 with whom the callee 14 is presently conversing or for any future calls the callee 14 receives from different callers. If no call is received, the VR module 40 may wait for a call at step 85. Thus, the callee 14 may initiate the voice-sample creation process at any time during a current telephone conversation or prior to a telephone conversation so long as a predefined access code (e.g., "12 or #9) is entered by the callee 14 through the keypad 34. The DTMF (dual tone multi frequency) audio tones transmitted over the telephone line 29 by the entry of the access code may be suppressed in the CR module 42 so that the caller 12 may not hear them if a conversation is in progress.

Once the collection of voice samples feature is activated by the callee 14 (at step 84) and as soon as a call is received from a caller 12 or so long a call is in progress, the VR module 40 initiates creation of caller's voice samples at step 86. The electrical audio speech signals received from the caller 12 over the telephone line 27 (FIG. 2) are periodically sampled and converted into corresponding digital signals and the sampled data is stored into a digital audio file, which can be similar to that described hereinbefore with reference to step 19 (FIG. 1) and step 70 (FIG. 5). Caller's voice samples are then extracted from this digital audio file using statistical digital signal processing techniques. Human voice parameters such as pitch, amplitude, intonation, etc., may be considered while creating a set of voice samples for a particular caller 12. The resulting set of voice samples or voice exemplars is stored in the database 44 at step 88. When more than one called party shares the same DCAS 25 (FIG. 2), the VR module 40 may inform the database 44 of the name or telephone extension number of the called party 14 for whom the voice exemplars are being stored. This allows the DC unit 44 to later identify appropriate caller 12 for a given callee 14.

The VR module 40 may continue generating voice samples for different callers until the collection of voice samples is deactivated by the callee 14 at step 94. Upon deactivation (by the callee 14) of voice sample collection process, the voice recognition software (in the VR module 40) ends, at step 96, the monitoring of the telephone line 27 for caller's voice.

Two optional process steps 90 and 92 may also be carried out (by the VR module 40) as illustrated in FIG. 6. If caller screening is desired in addition to caller's voice-based call routing, the VR module 40, at step 90, may prompt the callee 14 at the completion of the current phone conversation with the caller 12 to provide information about caller's identity. The callee 14 may speak the caller's name and other identifying information (e.g., caller's corporation or caller's employer) into microphone (not shown) of the handset 33 (FIG. 2), and the VR module 40 may convert the spoken information into a digital text file, e.g., an ASCII text file, at step 92. The VR module 40 then sends the digital text file to the DC unit 44 to be stored along with the set of voice exemplars just created for a given caller 12. This caller-identifying information may later be received by the VR module 40 (from the DC unit 44), which, in turn, may instruct the CR module 42 to display, for example, the caller's name on the display screen 36 (FIG. 2) or to transmit an announcement (in synthesized voice) of the caller's name via intercom facility if the called party's telephone 28 is equipped with intercom features.

In an alternative embodiment, the called party 14 may simply enter the identity information for the caller 12 using the DTMF keypad 34 (FIG. 2). The entered information may be displayed on the display screen 36 and any necessary correction may be made by the called party 14 prior to sending the information to the VR module 40 for storage in the DC unit 44 using one or more keys, e.g., * or #, on the keypad 34. In another embodiment, the called party 14 may be able to instruct the VR module 40 to delete (either using the keypad 34 or a voice command recognizable by the VR module 40) voice samples most-recently stored in the DC unit 44. An advanced DCAS system 25 may support deletion of any caller's voice samples from the DC unit 44. In the absence of a caller's voice samples in the DC unit 44, the caller 12 may not get directly connected to the called party 14, but, instead, may get connected to the message recording system 38 as discussed hereinbefore.

The digital call assistant system 25 according to the present invention may be integrated in each called party's telephone unit (e.g., the telephone unit 28). In such an event, the telephone company central office, a PBX or a wireless network may not need to implement the functionality of the call assistant system 25. Individual callee telephone unit may itself screen the caller prior to generating a ringing sound, thereby informing the callee 14 of the presence of a telephone call only in the event that the caller 12 is determined to be one of the callers who is "authorized" to directly talk to the callee 14. Similarly, a telephone answering machine (not shown) (e.g., an analog or digital answering machine internal or external to a telephone unit) or a telephone answering system in an organization may be modified to include a built-in DCAS 25. In such an application, the answering machine or the answering system with built-in DCAS 25 may "recognize" the caller and then allow only pre-selected callers to record messages. Upon identifying the caller as one of the proscribed callers, the answering machine or the answering system may simply disconnect the telephone line. Thus, unwanted callers (e.g., telemarketers) may be prevented from directly calling or leaving messages for the callee.

The foregoing describes exemplary embodiments of a call-routing and caller-screening system that employs voice recognition to automatically recognize a caller's voice and then screen a caller, if appropriate; all without forcing the caller to identity himself/herself, which may be perceived as rude or offensive by some callers. Instead, the caller is asked to identify who the caller wishes to speak with. Caller's response to this query is used to identify the callee as well as to optionally identify the caller. Thus, the screening of the caller takes place in a manner that the caller perceives as a more natural way of telephone communication. Caller's speech is not converted into a digital text file nor is it stored as such a text file. Instead, caller's speech is used to generate digital voice samples therefrom and the caller's voice samples are directly compared with other voice samples stored in a database. In the present invention, the caller is identified using a voice-to-voice comparison method instead of a voice-to-text conversion followed by a text-to-text comparison method of the prior art.

While several embodiments of the invention have been described, it should be apparent, however, that various modifications, alterations and adaptations to those embodiments may occur o persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A computer-readable medium having computer-executable instructions stored thereon which, when executed by a computer, will cause the computer to perform a method of screening a caller prior to establishing a telephone connection between the caller and a callee, the method comprising:
   receiving an indication from the callee of one or more callers that are authorized to be directly connected to the callee upon calling the callee;
   receiving a telephone call from a caller;
   prompting the caller to speak the name of the callee;
   receiving a voice sample from the caller;
   determining the callee from analysis of the voice sample, wherein the callee is a person and wherein the telephone call is directed to a telephone terminal for the callee for the purpose of speaking to the callee;
   identifying the caller by analyzing the voice sample of the caller received when the caller speaks the name of the callee;
   screening the telephone call based on an identity of the caller and based on a predefined authorization established by the callee stored in a digital call assistant; and
   routing the telephone call to a message recording system if the voice sample is a statistical allowable match to a previous voice sample and the caller is not authorized by the callee to directly connect to the callee.

2. The computer-readable medium of claim 1, wherein identifying the caller by analyzing the voice sample of the caller received when the caller speaks the name of the callee comprises:
   obtaining the previous voice recording of the caller's voice; and
   analyzing the voice sample by using the prior voice recording.

3. The computer-readable medium of claim 1, further comprising creating a database containing multiple sets of digital voice samples, wherein each set within the multiple sets contains at least one digital voice sample for a different one of a plurality of callers.

4. The computer-readable medium of claim 3, wherein identifying the caller includes:
   creating a test set of voice samples from the voice of the caller received when the caller speaks the name of the callee; and
   individually comparing the test set of voice samples with the each set of voice samples in the database to identify whether the caller is one of the plurality of callers.

5. The computer-readable medium of claim 1, further comprising routing the telephone call to a message recording system if the callee is unable to receive the telephone call.

6. The computer-readable medium of claim 1, further comprising creating a database containing a plurality of digital text files, wherein each of the plurality of digital text files contains identification information for a different one of a plurality of callees.

7. The computer-readable medium of claim 1, wherein identifying the caller includes:
   converting the name of the callee as spoken by the caller into a test digital text file; and
   individually comparing the test digital text file with the each of the plurality of digital text files in the database to identify the callee.

8. A computer-readable medium having computer-executable instructions stored thereon which, when executed by a computer, will cause the computer to perform a method of screening a caller prior to establishing a telephone connection between the caller and a callee, the method comprising:
   receiving an indication from the callee of one or more callers that are authorized to be directly connected to the callee upon calling the callee;
   receiving a telephone call from a caller;
   prompting the caller to speak the name of the callee;
   receiving a voice sample from the caller;

determining the callee from analysis of the voice sample, wherein the callee is a person and wherein the telephone call is directed to a telephone terminal for the callee for the purpose of speaking to the callee;

identifying the caller by analyzing the voice sample of the caller received when the caller speaks the name of the callee;

screening the telephone call based on an identity of the caller and based on a predefined authorization established by the callee stored in a digital call assistant; and routing the telephone call to the telephone terminal for the callee in response to determining that the voice sample is a statistical allowable match to a previous voice sample and the caller is authorized by the callee to directly connect to the callee.

9. The computer-readable medium of claim 8, wherein identifying the caller by analyzing the voice sample of the caller received when the caller speaks the name of the callee comprises:

obtaining the previous voice recording of the caller's voice; and analyzing the voice sample by using the prior voice recording.

10. The computer-readable medium of claim 8, further comprising creating a database containing multiple sets of digital voice samples, wherein each set within the multiple sets contains at least one digital voice sample for a different one of a plurality of callers.

11. The computer-readable medium of claim 10, wherein identifying the caller includes:

creating a test set of voice samples from the voice of the caller received when the caller speaks the name of the callee; and individually comparing the test set of voice samples with the each set of voice samples in the database to identify whether the caller is one of the plurality of callers.

12. The computer-readable medium of claim 8, further comprising routing the telephone call to a message recording system if the callee is unable to receive the telephone call.

13. The computer-readable medium of claim 1, further comprising creating a database containing a plurality of digital text files, wherein each of the plurality of digital text files contains identification information for a different one of a plurality of callees.

14. The computer-readable medium of claim 8, wherein identifying the caller includes:

converting the name of the callee as spoken by the caller into a test digital text file; and individually comparing the test digital text file with the each of the plurality of digital text files in the database to identify the callee.

15. A computer-readable medium having computer-executable instructions stored thereon which, when executed by a computer, will cause the computer to perform a method of screening a caller prior to establishing a telephone connection between the caller and a callee, the method comprising:

receiving an indication from the callee of one or more callers that are authorized to be directly connected to the callee upon calling the callee;

receiving a telephone call from a caller;

prompting the caller to speak the name of the callee;

receiving a voice sample from the caller;

determining the callee from analysis of the voice sample, wherein the callee is a person and wherein the telephone call is directed to a telephone terminal for the callee for the purpose of speaking to the callee;

identifying the caller by analyzing the voice sample of the caller received when the caller speaks the name of the callee;

screening the telephone call based on an identity of the caller and based on a predefined authorization established by the callee stored in a digital call assistant; and transmitting the identity of the caller via an intercom associated with the telephone terminal for the callee.

16. The computer-readable medium of claim 15 further comprising disconnecting the telephone call in response to the digital assistant determining that the voice sample does not match a previous voice sample.

17. The computer-readable medium of claim 15, wherein screening comprises:

routing the telephone call to the callee;

after ending the telephone call by the callee, maintaining the telephone call with the caller; and providing interaction with the callee.

18. The computer-readable medium of claim 17, wherein the interaction comprises obtaining the prior voice recording.

19. The computer-readable medium of claim 15, wherein the screening comprises routing the telephone call to the callee;

wherein the method further comprises:

after termination of the telephone call by the callee, maintaining the telephone call with the caller; and providing interaction with the caller.

20. The computer-readable medium of claim 15, wherein the digital call assistant resides in a wireless device for the callee.

* * * * *